Nov. 10, 1925.
H. L. GAGE
1,561,149
LIGHT PROJECTING LENS
Filed Feb. 9, 1923      3 Sheets-Sheet 1
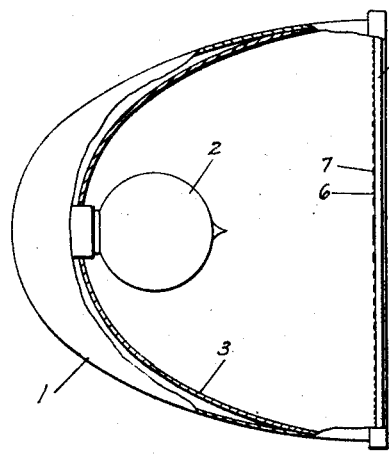
Fig. I
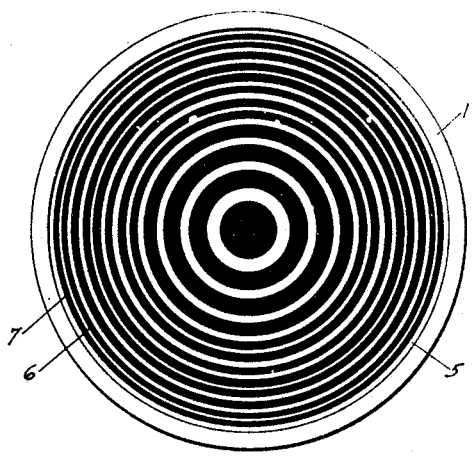
Fig. II
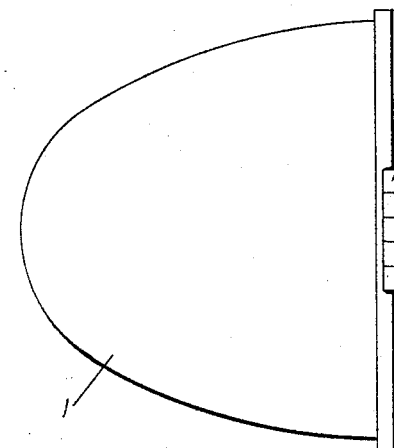
Fig. III
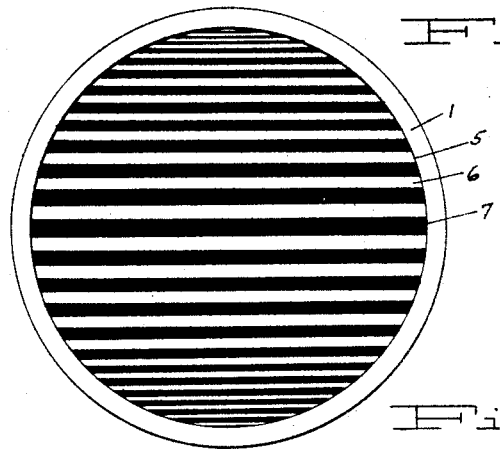
Fig. IV
INVENTOR:
Harold L. Gage,
By Atkins & Atkins,
ATTORNEYS.

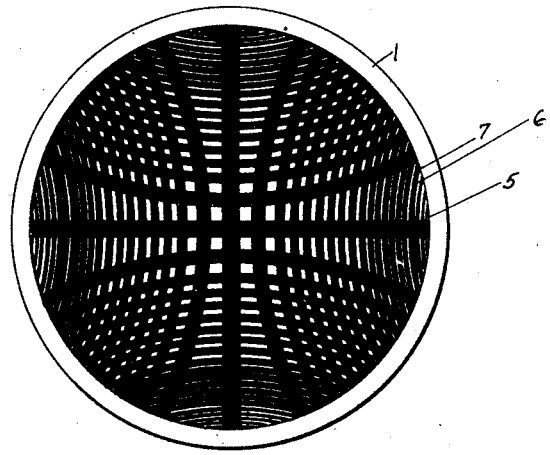
Fig. V
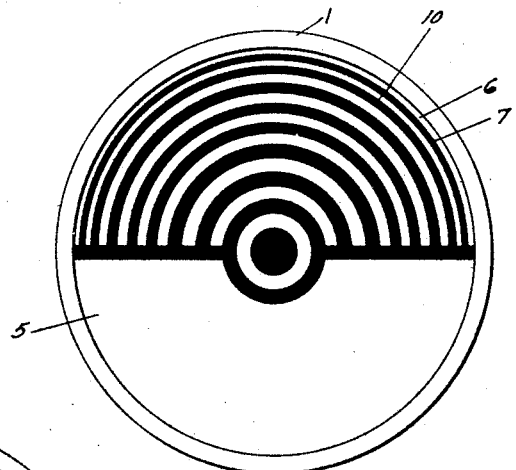
Fig. VI
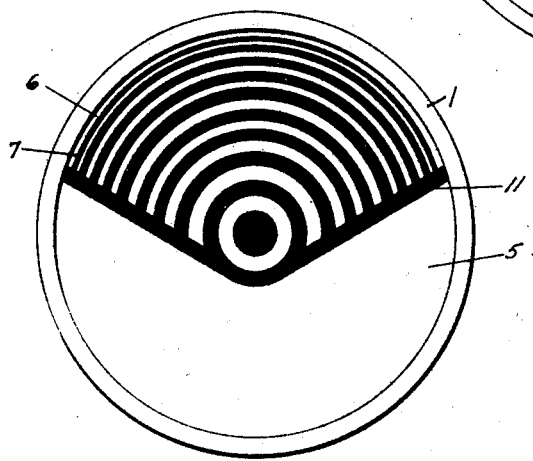
Fig. VII

Nov. 10, 1925.  1,561,149
H. L. GAGE
LIGHT PROJECTING LENS
Filed Feb. 9, 1923  3 Sheets-Sheet 3
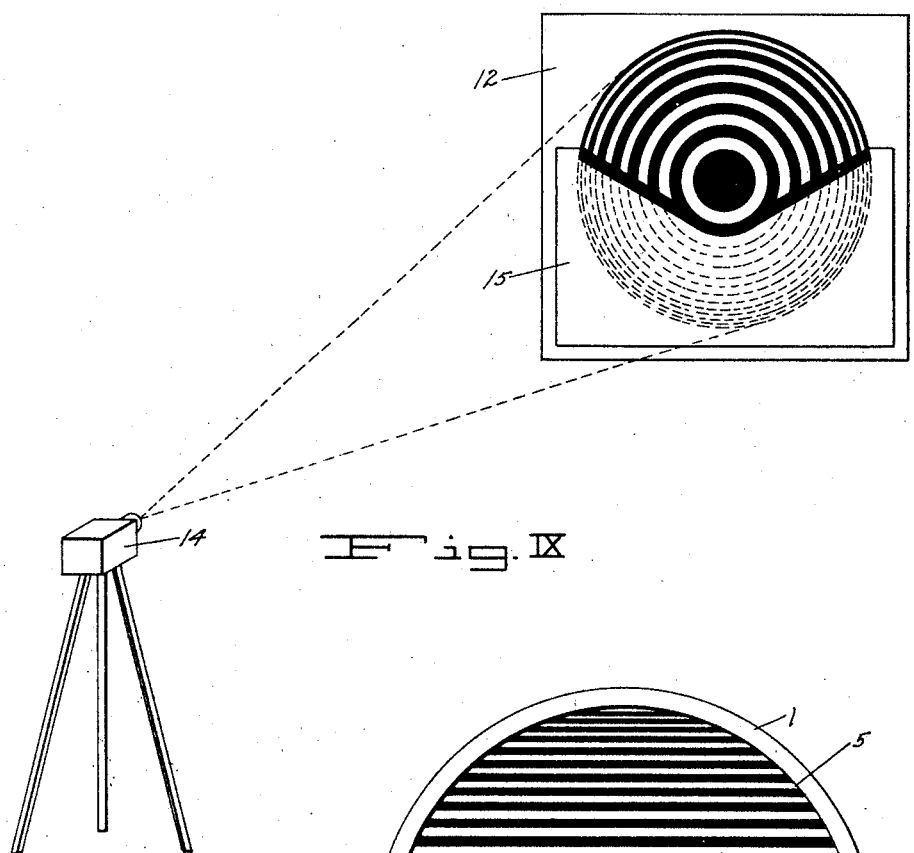
Fig. IX
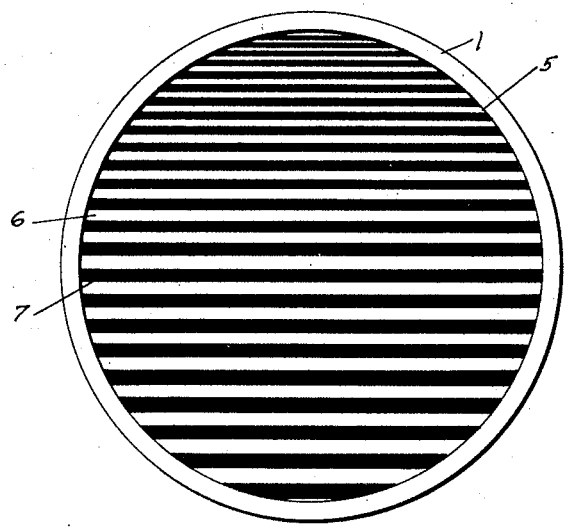
Fig. VIII
INVENTOR:
Harold L. Gage,
BY
Atkins & Atkins,
ATTORNEYS.

Patented Nov. 10, 1925.

1,561,149

UNITED STATES PATENT OFFICE.

HAROLD L. GAGE, OF SALEM, OREGON, ASSIGNOR OF ONE-THIRD TO FREDERICK FRANKLIN BURYA, OF WOODBURN, OREGON.

LIGHT-PROJECTING LENS.

Application filed February 9, 1923. Serial No. 618,009.

*To all whom it may concern:*

Be it known that I, HAROLD L. GAGE, a citizen of the United States of America, and resident of Salem, in the county of Marion, in the State of Oregon, have invented certain new and useful Improvements in Light-Projecting Lenses, of which the following is a specification, reference being had to the accompanying drawings.

My invention relates to lamps, such, for example only, as headlights of automobiles, and has for its main object the elimination of the blinding glare therefrom that is in road travel a well known source of danger, and so well recognized as to have been made the subject of legislative prohibition in different states.

My invention utilizes the principle of diffraction, whereby through variation of the illuminating power of a lamp there may be maintained in the lamp a substantially undiminished and a high degree of practical efficiency, while, at the same time, all glare otherwise emanating therefrom is removed. I accomplish this end proposed by causing the light emitted from the source thereof within the lamp to pass through a light-transmissive plate bearing a series of diffractive slits consisting of alternating strips or zones of light transmissive substance and of opaque substance, mathematically constructed, respectively, in accordance with a well known law of optics.

Plates of the kind described are hereinafter designated for convenient reference, zone plates. A distinctive feature of their application to road lighting is the ability to proportion their light emissive area to the candle-power of the light source used with them.

The zone plates employed may be varied indefinitely in appearance, though not in principle, in accordance with the rule of mathematical construction employed in the making of them; and the strips or zones which characterize them may extend wholly or partially over the entire plate, as will be hereinafter more fully explained.

What constitutes my invention will be hereinafter specified in detail and succinctly set forth in the appended claims.

In the accompanying drawings which constitute a part of this specification,

Figure I is a central longitudinal vertical section of one of my lamps in one form of embodiment of my invention.

Figure II is a front elevation of the same, showing one form of a zone plate.

Figure III is a view similiar to Figure I showing a hinged zone plate attached thereto and in open position, said zone plate being of form modified from that shown in Figure I.

Figure IV is a view similiar to Figure II, showing a further modification of zone plate.

Figures V, VI, VII, and VIII, show, respectively, various further modifications, in effect, of zone plates.

Figure IX is a partially diagrammatic illustration of that portion of my invention which relates to a method of manufacture of zone plates.

Referring to the numerals on the drawings, 1 indicates a lamp case of any usual or suitable and preferred design, form, and construction. It is provided on the inside with a lamp proper, 2, or source of light, and with a reflector 3 in operative disposition thereto. The combination of elements above specified may be of any usual or preferred type in respect to the individual elements themselves, and in respect to their relative arrangement or disposition.

My invention comprehends a plate 5, through which, light, from the source 2, is emitted from the inside to the outside of the case 1. Said plate may be a flat or plane surfaced plate, as illustrated, or it may be of any curvilinear contour in cross section that may be preferred and suitable for the purpose intended.

The plate 5 may be, for example, of the usual shape, construction, and disposition, common in the front plates of automobile headlights. Its distinguishing feature is that it bears upon its inside or outside surface, or both, as preferred, that series of diffracting strips or zones which go to constitute a zone plate. Whereof, in the drawings, 6 indicates the light transmissive strips or zones, and 7 indicates the light-obstructive, opaque, strips or zones. The plate 5 may be made, for example, of glass, of any preferred color or colors, clear glass being altogether well adapted for the purpose; but any other suitable transparent material for any reason preferred may be used.

The zones 6 preferably consist of the material of which the plate 5 is composed unobstructed in any wise, and, to the full capacity of said material, adapted for transmission of light emitted from the lamp 2.

By contrast with the zones 6, the zones 7 are distinctly opaque and positively light-obstructive. They may be made by any means suitable to effect the purpose desired. Without attempting to enumerate every method by which the said zones may be formed in or upon the plate 5, it may be specified that they may be made of pigment applied by any preferred method of application, such for example, as stenciling, brushing or printing, to the surface of the plate. The said surface may be first treated to receive the pigment, as by application of a sand blast, or an etching substance, or the surface of the plate may be provided, in manufacture or subsequently thereto, with grooves adapted to receive and hold a modicum of pigment or other filling or opaque material. Other methods of forming the plate beside those already suggested may be employed. For example, they may be made by the application to the surface of the blank plate of skeleton sheets made of paper or other flexible material secured to the plate by aid of any adhesive substance suitable for the purpose; by application of metal, as by electrolysis; and by photo etching or like methods. Also, the plates 5 might be, in the process of manufacture, made to comprehend opaque and transparent laminae disposed transversely to the surface of the plates, although the expense of this method would appear to be, for the present at least, prohibitive.

It has been specified that my zone plates are constructed in accordance with accepted laws of optics. Wherefore, the relative widths of the zones 6 and 7 increase and diminish in regular ratio, determined by the law of their construction. The relative widths of the zones are determined by the Fresnel-Huygens law, in accordance with which they are constructed. As illustrative of the law, if we describe on a large sheet of white paper circles, the radii of which are proportional to the square roots of their natural numbers, and blackened the alternate spaces between the circles, we shall have very nearly an exact drawing of a zone system constructed in accordance with this law. The zones upon the lens of my invention are formed substantially in accordance with this principle.

In Figure II, for example, I illustrate a disk of complete zones concentric with the plate 5, and which fills the entire plate. In Figure III is shown a series of zones struck from one center outside the plates. In Figure IV, an example of zones is shown comprising two series the widths of the spaces between the opaque portions in each series progressively increasing toward the center of the plate. In Figure V, four series of reticulated zones struck, respectively, from four centers outside the plate is illustrated. Figure VIII, shows zones apparently consisting of straight line strips, but this is only an effect produced upon the eye as if the zones be struck from a center outside the plate with radii approaching that of infinity. These variations are used to vary the disposition of the emitted light upon the roadway.

It was specified above that the plate 5 may be incorporated with and made part of the lamp case 1. If preferred, however, the plate 5 may be adapted for occasional or interrupted use. To that end it may be mounted in a separate frame 8 which may be hinged, as indicated at 9, to the case 1, and thereby adapted to be, at will, swung into or out of the line of direction along which the light rays are emitted from the lamp 2.

The plate 5 illustrated, for example, in Figure I, is an entirely practicable form of plate; but if desired, the plate 5 may be only partially and in a variety of modes covered by said zones.

For the partial covering of a plate 5, I illustrate, for example, in Figure VI a segmental shaped plate cover 10, and in Figure VII, a sector shaped plate cover 11. Such shape may be varied at discretion from the sector of the relative extent shown in Figure VII, to a sector of any desired extent or to a segment, or of crescentic or other curvilinear form within the periphery of the plate 5, if desired.

Whenever a plate 5 partially covered by zones is employed, it is made feasible, in consequence of the condition of intended use of the lamp of which it is a part, by the possibility to direct any unobstructed glare from the lamp downwardly only and against the road, the function of the cover 10 or 11 being only to modify such glaring rays of light as might, without the cover, reach the eye of a passerby, and at the same time to preserve for the lamp a maximum power of illumination.

Having now specified the features of my lamp, it remains to make reference more in detail to the mathematical construction of the plate 5 and to that preferred method of manufacture of the plate which, in part, constitutes my invention.

Reverting to the statement made above that the relative widths of the zones 6 and 7 may vary according to their law or rule of construction, it is deemed only necessary herein to designate that rule to be that known as the law of the spacing of the Fresnel-Huygens zones, which is, by that name, well known in the science of optics. This rule may be modified, if desired, by a suitable modification of the root indices of evolution.

It is sufficient, in respect to the phenomenon of diffraction, to define diffraction to be the deflection of light rays occasioned by the neighborhood of an opaque body to the course of the light rays when it passes by the edge of said opaque body. For the purposes of this invention, the best results of diffraction are obtained by providing for the opaque body or zones 7 a sharply defined edge across which the course of light rays passes outwardly from the lamp 2. This may be accomplished, in each individual instance, by careful work in the construction of the zones of a plate 5; but the work of construction of each zone, upon the small scale demanded and by hand, would be, to say the least, excessively expensive, laborious, and time-consuming. To overcome that difficulty, I have devised a method by which manufacture of zone plates may be accomplished with substantially perfect accuracy, certainty, and uniformity, and with all saving of time and labor that economy of commercial manufacture demands.

The method last referred to consists of providing, as shown in Figure IX, a master-pattern 12, which may be easily constructed on a large scale, with a degree of mathematical accuracy that is substantially perfect for practical purposes. By the employment of such a master-pattern as an objective to a photographic camera 14, a true reproduction upon the sensitized plate of the camera may be obtained that will possess the requisite lineal accuracy and relative sizes and disposition of the zones 6 and 7, and which may be reduced, without disturbance of ratio, to that scale of dimensions which the work in hand, in its various aspects, demands. In this connection let it be noted that said scale of dimensions should vary not only for different lamp cases 1, but even for the same lamp case, to suit the power of the lamp 2, and the shape and relative disposition thereto—either or both—of the reflector 3.

In respect to the relative power of the lamp, it is sufficient to explain that a high power lamp will, in order to produce best results, require narrower zones 6 than a lamp of lower power. Consequently in fitting a plate 5 to a particular lamp case it is necessary, in order to obtain best results including maximum illumination, to take into consideration the power of the lamp 2 employed, and to make selection of a plate 5 accordingly.

Furthermore, if a blank plate 5 is to be equipped with only a partial cover 10 or 11 for example, the master-pattern 12 may be, upon its exposure to the camera 14, covered to the extent desired by a mask 15 of shape and dimensions conformable to those of the cover 10 or 11, which said exposure is designed and adapted to delineate.

The photographic reproduction of the master-pattern constitutes what I denominate a shop pattern, that is to say, one of which a skeleton may be either applied directly to the surface of a suitable blank so as of itself to constitute it into a plate 5, or which may be used as a pattern for obtaining a fac-simile to be applied, by any means preferred, to the surface of a blank as aforesaid, in order to convert it into the finished form of plate 5 of the kind desired.

It is proper to add that after it is removed from the camera, the sensitized and light-struck plate, after development, is used to produce a print which may be cut or trimmed to desired dimensions and along guide lines supplied by the outside lines of the picture of the mask 15 which it presents to the eye. Also, if applied directly to a plate, the paper or other material on which is shown the zones through which light is transmitted, should be cut away in order to skeletonize it.

Further description of operation of my invention or mode of carrying it into effect, would, in view of the foregoing specification, appear to be superfluous.

What I claim is:

1. A lamp comprising a case, an illuminating device within the case, a reflector, and a zone plate attached to the case and provided with alternating opaque and transparent light diffraction zones, the relative widths of which increase and diminish substantially in accordance with a specified law, as described.

2. As a new article of manufacture, a lens for use with automobile vehicle lights having alternating opaque and transparent light diffraction zones, the relative widths of which increase and diminish substantially in accordance with a specified law, as described.

3. As an article of manufacture, a zone plate for lamps provided with a multiplicity of series of alternating opaque and transparent light diffraction zones, the relative widths of which increase and diminish, substantially in accordance with a specified law, as described, said series being curved and being struck from different centers.

In testimony whereof, I have hereunto set my hand.

HAROLD L. GAGE.